US010809072B1

(12) United States Patent
Timmons et al.

(10) Patent No.: US 10,809,072 B1
(45) Date of Patent: Oct. 20, 2020

(54) COMPUTATIONALLY EFFICIENT DISTANCE-BASED SCORE APPROXIMATIONS

(71) Applicant: Liberty Mutual Insurance Company, Boston, MA (US)

(72) Inventors: Justin Timmons, Boston, MA (US); Spencer Aronstein, Boston, MA (US); Scott Gorlin, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 172 days.

(21) Appl. No.: 16/054,613

(22) Filed: Aug. 3, 2018

Related U.S. Application Data

(63) Continuation-in-part of application No. 15/975,115, filed on May 9, 2018.
(Continued)

(51) Int. Cl.
G06K 9/46 (2006.01)
G06K 9/66 (2006.01)
(Continued)

(52) U.S. Cl.
CPC .............. G01C 21/32 (2013.01); G01C 22/02 (2013.01); G06F 16/29 (2019.01); *G06F 3/04842* (2013.01)

(58) Field of Classification Search
CPC ......... G01C 21/32; G01C 22/02; G06F 16/29; G06F 3/04842
See application file for complete search history.

(56) References Cited

U.S. PATENT DOCUMENTS 8,738,422 B2    5/2014  Lerner et al.
2011/0169946 A1  7/2011  Rudin et al.
(Continued)

FOREIGN PATENT DOCUMENTS

WO    WO 2016/145283    *  9/2016

OTHER PUBLICATIONS

Unknown Author, Technical Guides—Calculation of Road Traffic Noise 1988, Jul. 4, 2008, National Physical Laboratory, 2 pages, http://resource.npl.co.uk/acoustics/techguides/crtn/, Nov. 28, 2017.
Unknown Author, Density Calculations, Feb. 8, 2001, www.quantdec.com, 4 pages, http://www.quantdec.com/SYSEN597/GTKAV/section9/density.htm, Nov. 27, 2017.
(Continued)

Primary Examiner — Samir A Ahmed
(74) Attorney, Agent, or Firm — Alston & Bird LLP

(57) ABSTRACT

A distance-based score approximation having improved computational efficiency is provided. Responsive to receiving a score request, an observation point is identified based the score request. A geographic database is queried for map information corresponding to geometry elements located within a predetermined maximum distance of the observation point. A plurality of sections of the geometry elements are defined. Each section is associated with one of a plurality of groups of sections based on map information corresponding to a geometry element corresponding to the section. For each of the plurality of sections, an impact curtain area is determined. For each group of sections, the impact curtain area for each section associated with the group is aggregated to define a contribution for the group. The contribution for each group of sections is aggregated to determine the distance-based score. The distance-based score is provided for display via a display of a user computing entity.

20 Claims, 8 Drawing Sheets

Related U.S. Application Data

(60) Provisional application No. 62/577,787, filed on Oct. 27, 2017.

(51) Int. Cl.
*G01C 21/32* (2006.01)
*G01C 22/02* (2006.01)
*G06F 16/29* (2019.01)
*G06F 3/0484* (2013.01)

(56) References Cited

U.S. PATENT DOCUMENTS

| | | | |
|---|---|---|---|
| 2011/0257885 A1 | 10/2011 | Tuck et al. | |
| 2012/0330636 A1 | 12/2012 | Albou | |
| 2015/0110276 A1* | 4/2015 | Gereb | G01H 3/125 381/56 |
| 2015/0268043 A1 | 9/2015 | McFadden et al. | |
| 2015/0276402 A1 | 10/2015 | Grasser et al. | |
| 2015/0342005 A1 | 11/2015 | Akcasu et al. | |
| 2016/0238437 A1* | 8/2016 | Carlsen | G01H 3/125 |
| 2016/0334228 A1* | 11/2016 | Wang | G01C 21/3641 |
| 2017/0061761 A1* | 3/2017 | Kolla | G08B 21/0261 |
| 2018/0060758 A1 | 3/2018 | Alexandrov et al. | |

OTHER PUBLICATIONS

Unknown Author, CadnaA: Calculation of Noise Levels, Nov. 29, 2007, DataKustik GmbH, 2, https://www.datakustik.com/en/products/cadnaa/modeling-and-calculation/calculation-of-noise-levels/, Nov. 27, 2017.

Unknown Author, CadnaA: Calculation of Noise Levels at predefined Receiver Points (unknown publication date—Not archived on Internet), DataKustik GmbH, 2 pages, http://www.datakustik.com/en/products/cadnaa/modeling-and-calculation/calculation-of-noiselevels/at-receiver-points/, Nov. 28, 2017.

Mannell, Robert, Basic Acoustics, Dec. 1, 2008, Macquarie University, 15 pages, http://clas.mq.edu.au/speech/acoustics/basic_acoustics/basic_acoustics.html, Nov. 28, 2017.

Department of Transport, Welsh Office, Calculation of Road Traffic Noise, Jan. 1, 1988, Crown Publications, London, Her Majesty's Stationary Office, 100 pages.

Bhaskar, Ashish, et al., Integration of a Road Traffic Noise Model (ASJ) and Traffic Simulation (Avenue) for a Built-Up Area, Jan. 1, 2004, Urban Transport X, 783-794, 75, https://www.witpress.com/Secure/elibrary/papers/UT04/UT04076FU.pdf, Nov. 27, 2017.

Author Unknown, Methodology: The Livability Score, Apr. 16, 2013, AreaVibes, 2 pages, http://www.areavibes.com/methodology/, Nov. 28, 2017.

United States Patent and Trademark Office, Notice of Allowance for U.S. Appl. No. 15/975,115, dated Jan. 27, 2020, (12 pages), USA.

* cited by examiner

COMPUTATIONALLY EFFICIENT DISTANCE-BASED SCORE APPROXIMATIONS

CROSS-REFERENCE TO RELATED APPLICATIONS

This application is a continuation-in-part of U.S. application Ser. No. 15/975,115, filed May 9, 2018, which claims the benefit of U.S. Provisional Application No. 62/577,787, filed Oct. 27, 2017, which are hereby incorporated herein in their entireties.

BACKGROUND

Digital map information/data is now available that provides a rich set of information/data regarding the location of buildings, topographies, vegetation, structures, roadways, etc. For example, digital map information/data provides a detailed picture of road geometries and/or road attributes. In some instances, it may be desirable to determine a distance-based score (and/or other types of scores) based on the road geometry provided by digital map information/data. For example, it may be desired to determine a noise score by summing the noise contribution of roads within the vicinity of a house or building. However, noise from a particular section of road dissipates as the inverse of the square of the distance from that particular section of road. Thus, each particular section of road provides a different level of noise contribution to the total noise score at the house or building. Therefore, determining a noise score by summing up the noise contribution of roads within the vicinity of a house is not straight forward and is computationally expensive.

Accordingly, there is a technical need in the art for improved technical methods, apparatuses, systems, computer program products, and/or the like for determining a distance-based score (and/or other types of scores), such as a noise score, and/or an approximation thereof, for example, that are computationally efficient.

BRIEF SUMMARY

Example embodiments provide methods, apparatuses, systems, and computer program products for determining an approximation of a distance-based score (and/or other types of scores) that is determined based on geometry elements of a geographic database storing map information/data in a computationally efficient manner. In an example embodiment, an impact surface about an observation point is defined and the value of the impact surface at a point along a roadway or other source of interest (e.g., described as a geographic element in, for example, a geographic database) is used as a weight for determining the impact of that point along the roadway or other source of interest on a distance-based score corresponding to the observation point. For example, in an example embodiment, a noise impact surface is defined about an observation point (e.g., a house) and the noise impact surface is used to determine weights corresponding to points along a road segment to determine the impact of the points along the road segment to a noise score for the observation point.

According to an aspect of the present invention, a method for improving the computational efficiency of a distance-based score approximation is provided. In an example embodiment, the method comprises responsive to receiving a score request, identifying, by a computing entity, an observation point based on a location indicated in the score request. The method further comprises querying, by the computing entity, a geographic database for map information corresponding to geometry elements located within a predetermined maximum distance of the observation point. The geometry elements within the predetermined maximum distance of the observation point comprise one or more geometry elements. The method further comprises defining, by the computing entity, a plurality of sections of each of the one or more geometry elements. Each section is associated with one of a plurality of groups of sections based on map information corresponding to a geometry element corresponding to the section. The method further comprises, for each of the plurality of sections, determining, by the computing entity, an impact curtain area. The method further comprises for each group of sections, aggregating, by the computing entity, the impact curtain area for each section associated with the group to define a contribution for the group. The method further comprises aggregating, by the computing entity, the contribution for each group of sections to determine the distance-based score; and providing, by the computing entity, the distance-based score for display via a display of a user computing entity.

According to another aspect of the present invention, an apparatus is provided. In an example embodiment, the apparatus comprises at least one processor and at least one memory storing computer program code. The at least one memory and the computer program code configured to, with the processor, cause the apparatus to at least responsive to receiving a score request, identify an observation point based on a location indicated in the score request; query a geographic database for map information corresponding to geometry elements located within a predetermined maximum distance of the observation point; define a plurality of sections of each of the one or more geometry elements; for each of the plurality of sections, define an impact curtain area; for each group of sections, aggregate the impact curtain area for each section associated with the group to define a contribution for the group; aggregate the contribution for each group of sections to determine the distance-based score; and provide the distance-based score for display via a display of a user computing entity. Each section is associated with one of a plurality of groups of sections based on map information corresponding to a geometry element corresponding to the section.

According to yet another aspect of the present invention, a computer program product is provided. In an example embodiment, the computer program product comprises at least one non-transitory computer-readable storage medium having computer-readable program code portions stored therein. The computer-readable program code portions comprising executable portions configured, when executed by a processor of an apparatus, to cause the apparatus to responsive to receiving a score request, identify an observation point based on a location indicated in the score request; query a geographic database for map information corresponding to geometry elements located within a predetermined maximum distance of the observation point; define a plurality of sections of each of the one or more geometry elements; for each of the plurality of sections, define an impact curtain area; for each group of sections, aggregate the impact curtain area for each section associated with the group to define a contribution for the group; aggregate the contribution for each group of sections to determine the distance-based score; and provide the distance-based score for display via a display of a user computing entity. Each section is associated with one of a plurality of groups of sections based on map information corresponding to a geometry element corresponding to the section.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF EXAMPLE EMBODIMENTS

Figure 1:
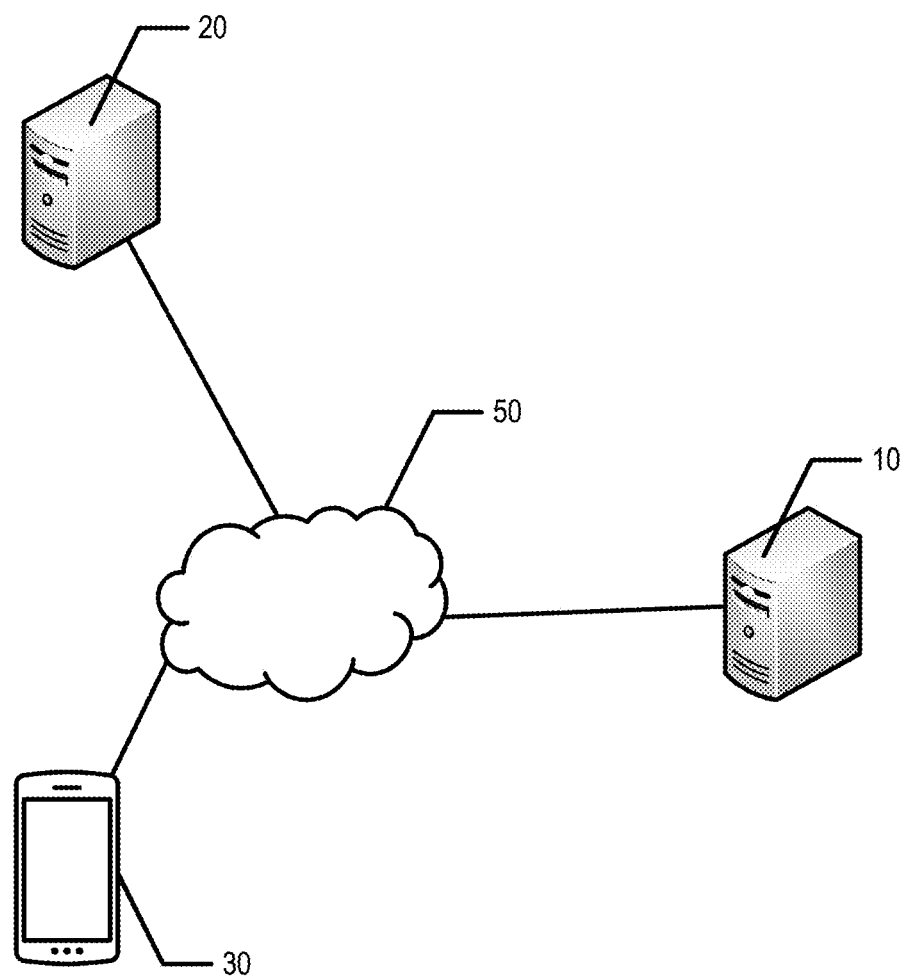
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Brief Overview

Example embodiments of the present invention provide a computationally efficient technique for determining a distance-based score for an observation point based on geometry elements corresponding to map information/data of a digital map (e.g., stored in a geographic database). For example, in an example embodiment, the observation point is a house, the distance-based score is a noise score, and the geometry elements considered are roads. In an example embodiment, the score contribution for point along a geometry element is determined based on a corresponding value of an impact surface centered on the observation point. In an example embodiment, the score contribution for a section of a geometry element is determined based on the area of an impact curtain extending down from the impact surface to the section of the geometry element. In an example embodiment, a unit length of a geometry element (e.g., a road) will provide a certain intensity contribution (e.g., noise contribution) to the total score (e.g., noise score) for an observation point (e.g., house) and the noise contribution is weighted based on the aggregated value of the impact curtain area for each section of the geometry element. In an example embodiment, the impact surface defines isolines that are concentric circles centered on the observation point. In an example embodiment, the impact surface takes into account various damping and/or occlusion elements such that the isolines of the impact surface do not define concentric circles. In various embodiments, the values of the impact surface decrease within increasing distance from the observation point. In an example embodiment, the values of the impact surface decrease as the square of the inverse of the distance from the observation point.

In an example embodiment, the distance-based score is a noise score and the geometry elements considered represent road segments of a road network. In another example embodiment, the distance-based score is a building density score and the geometry elements considered are buildings. As should be understood, various embodiments may correspond to various types of distance-based scores and each distance-based score may correspond to a set of geometry elements and an impact surface such that the distance-based score may be determined based at least in part on the values of the impact surface corresponding to the geometry elements. In various embodiments, the determination of the distance-based score is significantly more computationally efficient than traditional distance-based score determination techniques.

II. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD- ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of an exemplary embodiment of the present invention. As shown in FIG. 1, this particular embodiment may include two or more score computing entities 10, one or more map computing entities 20, one or more user computing entities 30, one or more networks 50, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Score Computing Entity

Figure 2:
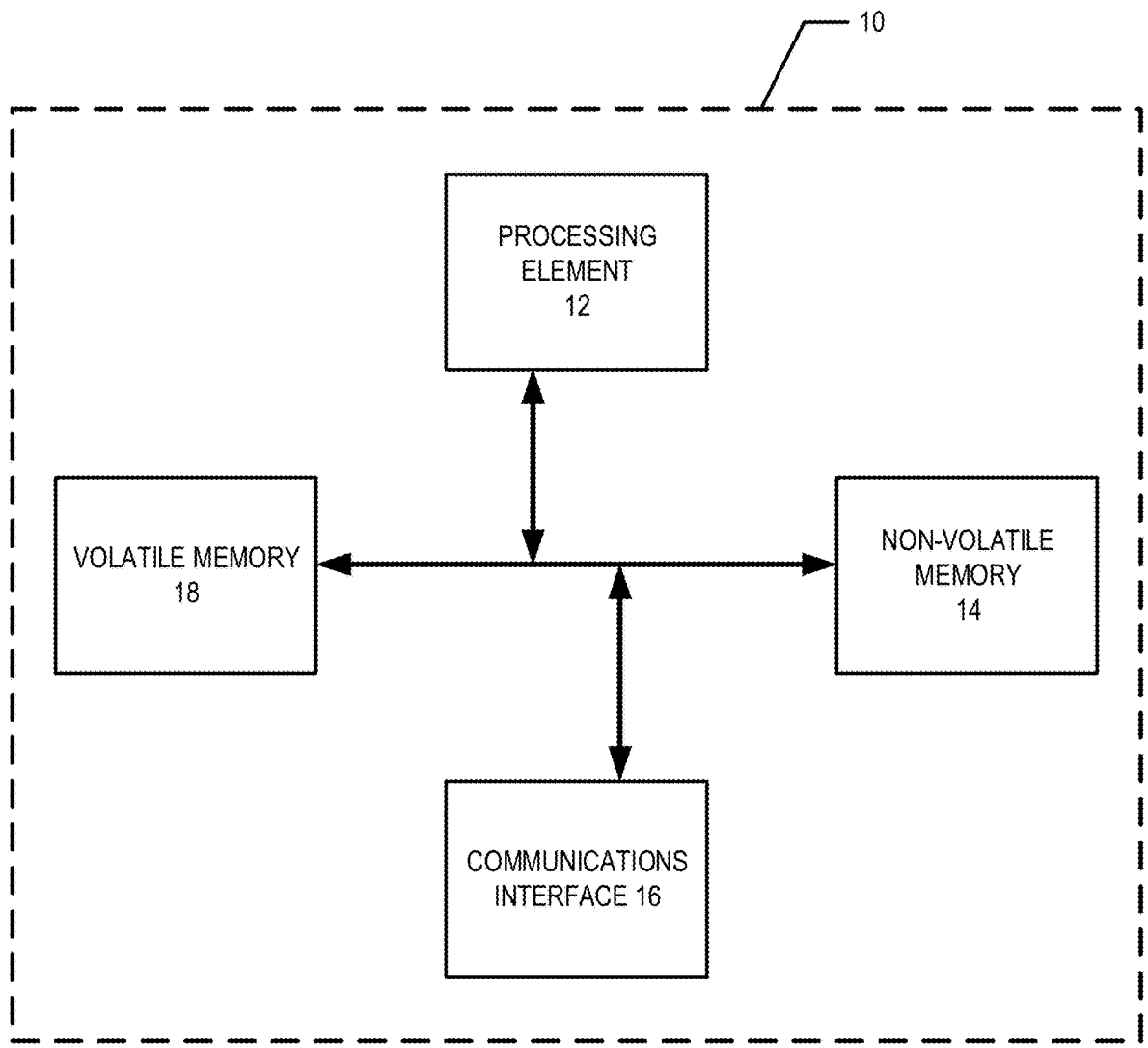
FIG. 2 is an exemplary schematic diagram of a score computing entity according to one embodiment of the present invention.

FIG. 2 provides a schematic of a score computing entity 10 according to one embodiment of the present invention. In an example embodiment, a score computing entity 10 may be a computing entity configured to determine a distance-based score (and/or other types of scores). In general, the terms computing entity, computer, entity, device, system, and/or similar words used herein interchangeably may refer to, for example, one or more computers, computing entities, desktops, mobile phones, tablets, phablets, notebooks, laptops, distributed systems, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the score computing entity 10 may also include one or more communications interfaces 16 for communicating with various computing entities, such as by communicating information/data, content, information, and/or similar terms used herein interchangeably that can be transmitted, received, operated on, processed, displayed, stored, and/or the like. For instance, the score computing entity 10 may communicate with user computing entities 30, map computing entities 20, and/or the like via one or more wired or wireless networks 50.

As shown in FIG. 2, in one embodiment, the score computing entity 10 may include or be in communication with one or more processing elements 12 (also referred to as processors, processing circuitry, processing device, and/or similar terms used herein interchangeably) that communicate with other elements within the score computing entity 10 via a bus, for example. As will be understood, the processing element 12 may be embodied in a number of different ways. For example, the processing element 12 may be embodied as one or more complex programmable logic devices (CPLDs), microprocessors, multi-core processors, coprocessing entities, application-specific instruction-set processors (ASIPs), microcontrollers, and/or controllers. Further, the processing element 12 may be embodied as one or more other processing devices or circuitry. The term circuitry may refer to an entirely hardware embodiment or a combination of hardware and computer program products. Thus, the processing element 12 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 12 may be configured for a particular use or configured to execute instructions stored in volatile or non-volatile media or otherwise accessible to the processing element 12. As such, whether configured by hardware or computer program products, or by a combination thereof, the processing element 12 may be capable of performing steps or operations according to embodiments of the present invention when configured accordingly.

In one embodiment, the score computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 14, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or information/data that is stored in a computer-readable storage medium, such as via a relational database, hierarchical database, and/or network database.

In one embodiment, the score computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 18, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 12. Thus, the databases, database instances, database management systems, information/data, applications, programs, program modules, scripts, source code, object code, byte code, compiled code, interpreted code, machine code, executable instructions, and/or the like may be used to control certain aspects of the operation of the score computing entity 10 with the assistance of the processing element 12 and operating system.

As indicated, in one embodiment, the score computing entity 10 may also include one or more communications interfaces 16 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the score computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Bluetooth protocols, Wibree, Zigbee, Home Radio Frequency (HomeRF), Simple Wireless Abstract Protocol (SWAP), wireless universal serial bus (USB) protocols, and/or any other wireless protocol.

Although not shown, the score computing entity 10 may include or be in communication with one or more input elements, such as a keyboard input, a mouse input, a touch screen/display input, motion input, movement input, audio input, pointing device input, joystick input, keypad input, and/or the like. The score computing entity 10 may also include or be in communication with one or more output elements (not shown), such as audio output, video output, screen/display output, motion output, movement output, and/or the like.

As will be appreciated, one or more of the score computing entity's 10 components may be located remotely from other score computing entity 10 components, such as in a distributed system. Furthermore, one or more of the components may be combined and additional components performing functions described herein may be included in the score computing entity 10. Thus, the score computing entity 10 can be adapted to accommodate a variety of needs and circumstances. As will be recognized, these architectures and descriptions are provided for exemplary purposes only and are not limiting to the various embodiments.

2. Exemplary User Computing Entity

Figure 3:
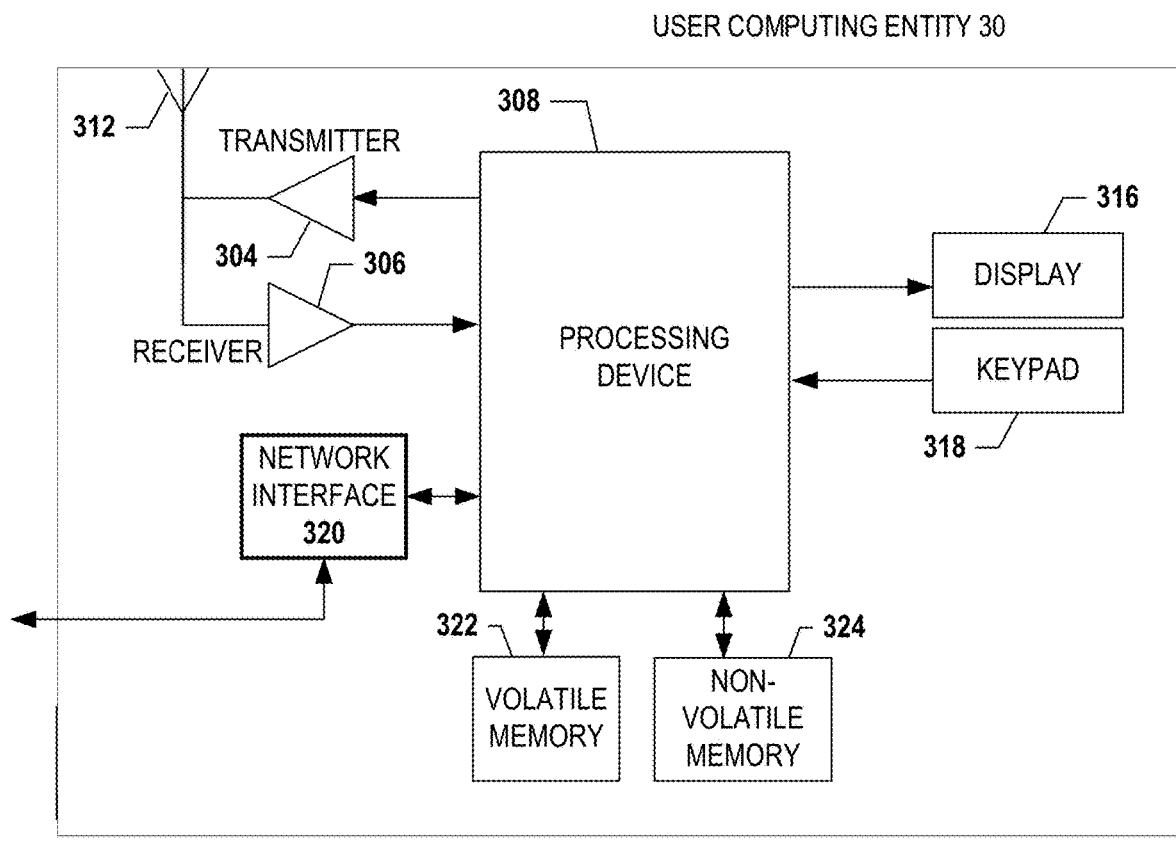
FIG. 3 is an exemplary schematic diagram of a user computing entity according to one embodiment of the present invention.

FIG. 3 provides an illustrative schematic representative of a user computing entity 30 that can be used in conjunction with embodiments of the present invention. In one embodiment, a user may be an insurance agent, a real estate agent (e.g., a realtor), an assessor, a consumer (e.g., a homeowner or perspective homeowner), and/or the like. In an example embodiment, the user computing entity 30 may request a distance-based score (e.g., a noise score) for a particular observation point (e.g., a house, a lot, and/or other physical location), receive the distance-based score, and display and/or provide (e.g., audibly provide) the distance-based score to the user. For example, the user computing entity 30 may store application computer code, that when executed by the processing device 308, causes the user computing entity 30 to provide an interactive user interface via the display 316 that a user may interact with to request a distance-based score (e.g., to cause the user computing entity 30 to generate and provide and/or transmit a score request) and provide and/or display the requested distance-based score to the user.

In one embodiment, a user computing entity 30 may include one or more components that are functionally similar to those of the score computing entity 10, and/or the like. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. For example, the user computing entity 30 may be a user's mobile device, such as a tablet or smart phone, in an example embodiment. As shown in FIG. 3, the user computing entity 30 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the score computing entity 10. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR protocols, NFC protocols, Bluetooth (including BLE) protocols, Wibree, Zigbee, HomeRF, SWAP, USB protocols, and/or any other wired or wireless protocol. Similarly, the user computing entity 30 may operate in accordance with multiple wired communication standards and protocols, such as those described above with regard to the score computing entity 10 via a network interface 320.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include a location determining aspects, device, module, functionality, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. For example, the user computing entity 30 may comprise a global navigation satellite system (GNSS) location determining aspect. In one embodiment, the location module can acquire information/data, sometimes known as ephemeris information/data, by identifying the number of satellites in view and the relative positions of those satellites (e.g., using GNSS or GPS). The satellites may be a variety of different satellites, including LEO satellite systems, DOD satellite systems, the European Union Galileo positioning systems, the Chinese Compass navigation systems, Indian Regional Navigational satellite systems, and/or the like. This information/data can be collected using a variety of coordinate systems, such as the DD; DMS; UTM; UPS coordinate systems; and/or the like. Alternatively, the location information/data can be determined/identified by triangulating the user computing entity's 30 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The user computing entity 30 may also comprise a user interface (that can include a display 316 coupled to a processing element 308) and/or a user input/interaction interface (coupled to a processing element 308). For example, a user application, browser, user interface, and/or similar words used herein interchangeably executing on and/or accessible via the user computing entity 30 may provide an interactive user interface with which a user may interact with (e.g., via one or more output elements such as a display or speaker of the user computing entity 30 and/or one or more input elements such as a hard or soft keyboard, touch screen, mouse, and/or the like of the user computing entity 30) and/or cause display of information/data from the score computing entity 10, as described herein. The user input/interaction interface can comprise any of a number of devices allowing the user computing entity 30 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input/interaction interface can be used, for example, to activate or deactivate certain functions, such as screen savers and/or sleep modes.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the score computing entity 10 and/or various other computing entities.

In another embodiment, the user computing entity 30 may include one or more components or functionality that are the same or similar to those of the score computing entity 10, as described in greater detail above. As will be recognized, these architectures and descriptions are provided for exemplary purposes only and are not limiting to the various embodiments.

3. Exemplary Map Computing Entity

In one embodiment, a map computing entity 20 may be operated by a map provider. For example, the map provider may generate, update, and/or provide a geographic database comprising map information/data. In one embodiment, a map computing entity 20 may include one or more components that are functionally similar to those of the score computing entity 10, the user computing entity 30, and/or the like. For example, in one embodiment, each map computing entity 20 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. The map computing entity 20 may communicate with various other computing entities, such as score computing entities, and/or various other computing entities. For example, the map computing entity 20 may provide (e.g., transmit) map information/data to one or more computing entities, such as the score computing entity 10. As will be recognized, these architectures and descriptions are provided for exemplary purposes only and are not limiting to the various embodiments.

4. Geographic Database

In various embodiments, the score computing entity 10 may store a geographic database and/or receive map information/data from a geographic database stored by the map computing entity 20. The score computing entity 10 may comprise a geographic information system (GIS) configured to access, process, and/or the like map information/data. For example, the score computing entity 10 may also include or have access to a map information/data database that includes a variety of information/data (e.g., map information/data) utilized for displaying a map, constructing a route or navigation path and/or other map related functions. For example, the score computing entity 10 may receive at least a portion of a geographic database comprising map information/data provided by a map computing entity 20. For example, a geographic database may include node data, road segment or link information/data records, point of interest (POI) information/data records, event of interest information/data records, and other information/data records. More, fewer or different information/data records can be provided. In one embodiment, the other information/data records include cartographic ("carto") information/data records, routing data, and/or the like. For example, the geographic database may comprise map information/data including boundary, location, and attribute information/data corresponding to the various geometry elements, POIs, events of interest, and/or the like.

One or more portions, components, areas, layers, features, text, and/or symbols of the POI or event information/data can be stored in, linked to, and/or associated with one or more of these information/data records. For example, one or more portions of the POI, event data, or recorded route information can be matched with respective map or geographic records via position or Global Navigation Satellite System (GNSS) and/or Global Positioning System (GPS) information/data associations (such as using known or future map matching, geo-coding, and/or reverse geo-coding techniques), for example. As will be recognized, the map information/data can be stored using a variety of formats, layers, and/or the like—including shapefiles, ArcMaps, geodatabases, coverages, imagery, rasters, computer-aided drafting (CAD) files, other storage formats, and/or the like. For instance, the score computing entity 10 can appropriately store/record map information/data as a part of a digital map, e.g., as part of a feature layer, raster layer, service layer, geoprocessing layer, basemap layer, service area layer, constituent area layer, and/or the like.

In an example embodiment, the road segment information/data records are links or segments representing roads, streets, or paths. The node information/data records are end points corresponding to the respective links or segments of the road segment information/data records. The road link information/data records and the node information/data records represent a road network, such as used by vehicles, cars, and/or other entities. Alternatively, the geographic database can contain path segment and node information/data records or other information/data that represent pedestrian paths or areas in addition to or instead of the vehicle road record data, for example.

The road/link segments and nodes can be associated with attributes, such as geographic coordinates (e.g., latitude and longitude), street segment names or identifiers, street names, address ranges, speed limits, turn restrictions at intersections, and other navigation related attributes, as well as service points, events of interest, and/or POIs, such as gasoline stations, hotels, restaurants, museums, stadiums, offices, automobile dealerships, auto repair shops, buildings, stores, parks, etc. For example, in an example embodiment, the road/link segments may be associated with attributes such as road classification indicators (e.g., highway, primary road, bike path, etc.), traffic volume estimates, and/or the like. For example, geometry elements, events of interest, and/or POIs can be represented in digital maps as being accessible by one or more street networks or street segments of a street network. A "street network" is collection of street segments that comprise navigable/traversable/travelable roads, streets, highways, paths, trails, walkways, entrance and exit ramps, bridges, sidewalks, alleys, and/or the like that can be used to access geometry elements, events of interest, and/or POIs. Similarly, geometry elements, events of interest, POIs, street networks, and/or the like can be represented in digital maps as navigable/traversable/travelable segments or points for traveling to and/or from geometry elements, events of interest, and/or POIs.

The geographic database can include information/data about the geometry elements, events of interest, and/or POIs and their respective locations in the geometry elements, events of interest, and/or POI information/data records. The geographic database can also include information/data about places, such as cities, towns, or other communities, and other geographic features, such as bodies of water, mountain ranges, etc. Such place or feature information/data can be part of the POI information/data or can be associated with POIs or POI information/data records (such as an information/data point used for displaying or representing a position of a city). In addition, the geographic database can include and/or be associated with event information/data (e.g., traffic incidents, constructions, scheduled events, unscheduled events, etc.) associated with the POI information/data records or other records of the geographic database. For example, in one embodiment, a geometry element, event of interest, and/or POI may be represented by and/or associated with a longitude and latitude, a geocode, a nearest street segment, an address, and/or the like. As will be recognized, a variety of other approaches and techniques can be used to adapt to various needs and circumstances.

In one embodiment, the score computing entity 10 may store digital maps. In another embodiment, the score computing entity 10 may be in communication with or associated with one or more map computing entities 20 (e.g., mapping websites/servers/providers/databases, including providers such as openstreetmaps.org, maps.google.com, bing.com/maps, mapquest.com, Tele Atlas °, NAVTEQ, and/or the like) that provide map information/data (or other content) of digital maps to a variety of users and/or entities. For example, the score computing entity 10 may be in communication with one or more map computing entities 20, store map information/data previously received from one or more map computing entities 20, and/or the like. Using the digital maps, an appropriate computing entity can provide map information/data, for example, about geometry elements, events of interest, and/or POIs (e.g., their locations, attributes, and/or the like) and/or their corresponding street networks based on map information/data.

In one embodiment, the score computing entity 10 can identify and/or retrieve map information/data associated with observation points and/or geographic areas. A geographic area may be one or more residential blocks, sub-neighborhoods, neighborhoods, districts, constituent areas, geographical areas, roads, zip codes, area codes, cities, counties, states, provinces, countries, socio-culturally defined areas, politically defined areas, and/or other identifiable locations.

The geographic database can be maintained by the map or content provider (e.g., a map developer) in association with the services platform. By way of example, the map developer can collect geographic information/data to generate and enhance the geographic database. There can be different ways used by the map developer to collect data. These ways can include obtaining information/data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or information/data in the master geographic database can be in an Oracle spatial format, .kml, SQL, PostGIS, or other spatial format, such as for development or production purposes. The Oracle spatial format or development/production database can be compiled into a delivery format, such as a geographic information/data files (GDF) format. The information/data in the production and/or delivery formats can be compiled or further compiled to form geographic database products or databases, which can be used in end user computing entities or systems.

For example, geographic information/data is compiled (such as into a platform specification format (PSF) format) to organize and/or configure the information/data for performing various map related functions including map display, speed calculation, route calculation, distance and travel time functions, and other functions. For example, fusion tables and/or PostGIS software may be used to organize and/or configure the information/data for performing various map related functions. The compilation to produce the end user databases can be performed by a party or entity separate from the map developer. For example, a customer of the map developer, such as a navigation device developer or other end user computing entity developer, can perform compilation on a received geographic database in a delivery format to produce one or more compiled navigation databases.

IV. Exemplary System Operation

As noted above, example embodiments provide methods, apparatuses, systems, and computer program products for determining a distance-based score (and/or other types of scores) in a computationally efficient manner. In an example embodiment, the distance-based score is a noise score. For example, the distance-based score may be determined based on the geometry elements of map information/data accessed from the map database. In an example embodiment wherein the distance-based score is a noise score, the geometry elements represent road segments of a road network.

Figure 4:
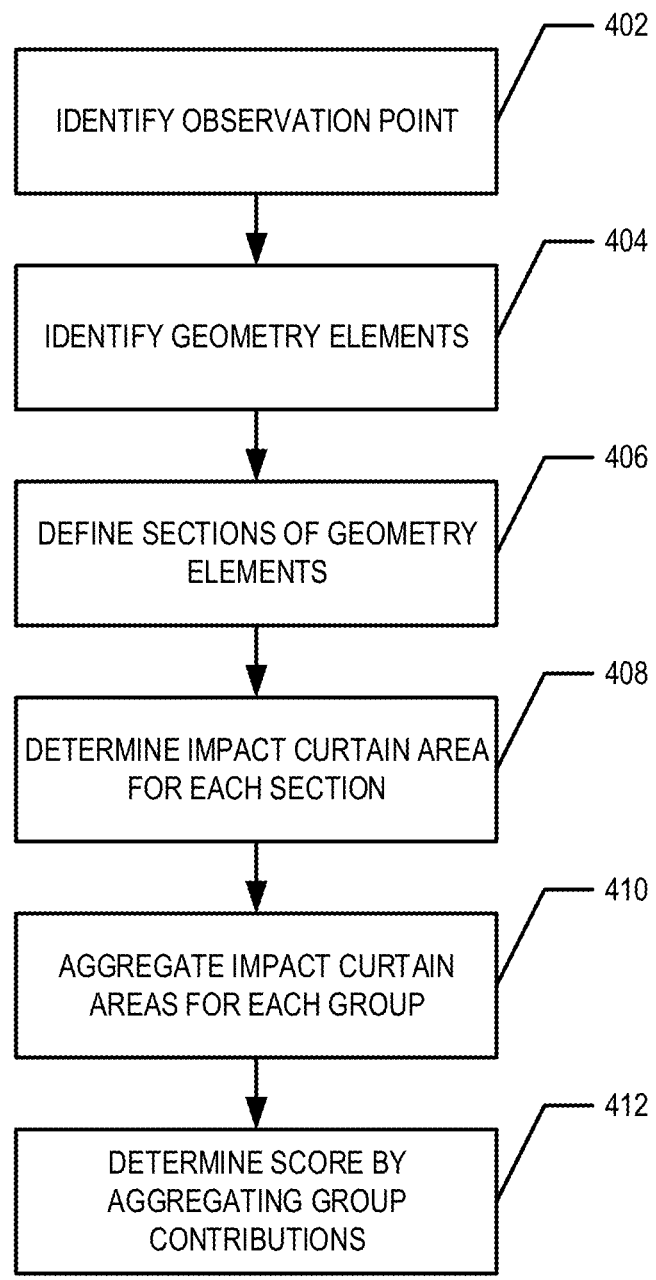
FIG. 4 is a flowchart illustrating example processes and procedures for determining a distance-based score according to one embodiment of the present invention.

FIG. 4 provides a flowchart illustrating processes and procedures for determining a distance-based score (and/or other types of scores) in a computationally efficient manner according to an example embodiment.

Starting at block 402, an observation point O (see FIG. 7) is identified. For example, in an example embodiment, a score computing entity 10 may receive a score request (e.g., via the communications interface 16). For example, a user computing entity 30 may provide (e.g., transmit) a score request (e.g., via transmitter 304 or network interface 320). In an example embodiment, the score request may comprise an address (e.g., a street address), a geocode (e.g., a latitude and longitude pair), and/or the like. For example, the location determining aspect of the user computing entity 30 may determine the geocode corresponding to the observation point O. The observation point O may be a house or other building, a location, a piece of property, a lot, and/or the like. In an example embodiment, the score request may comprise image information/data captured at and/or near the location of the observation point O and/or comprising an image of the observation point O.

Figure 5:
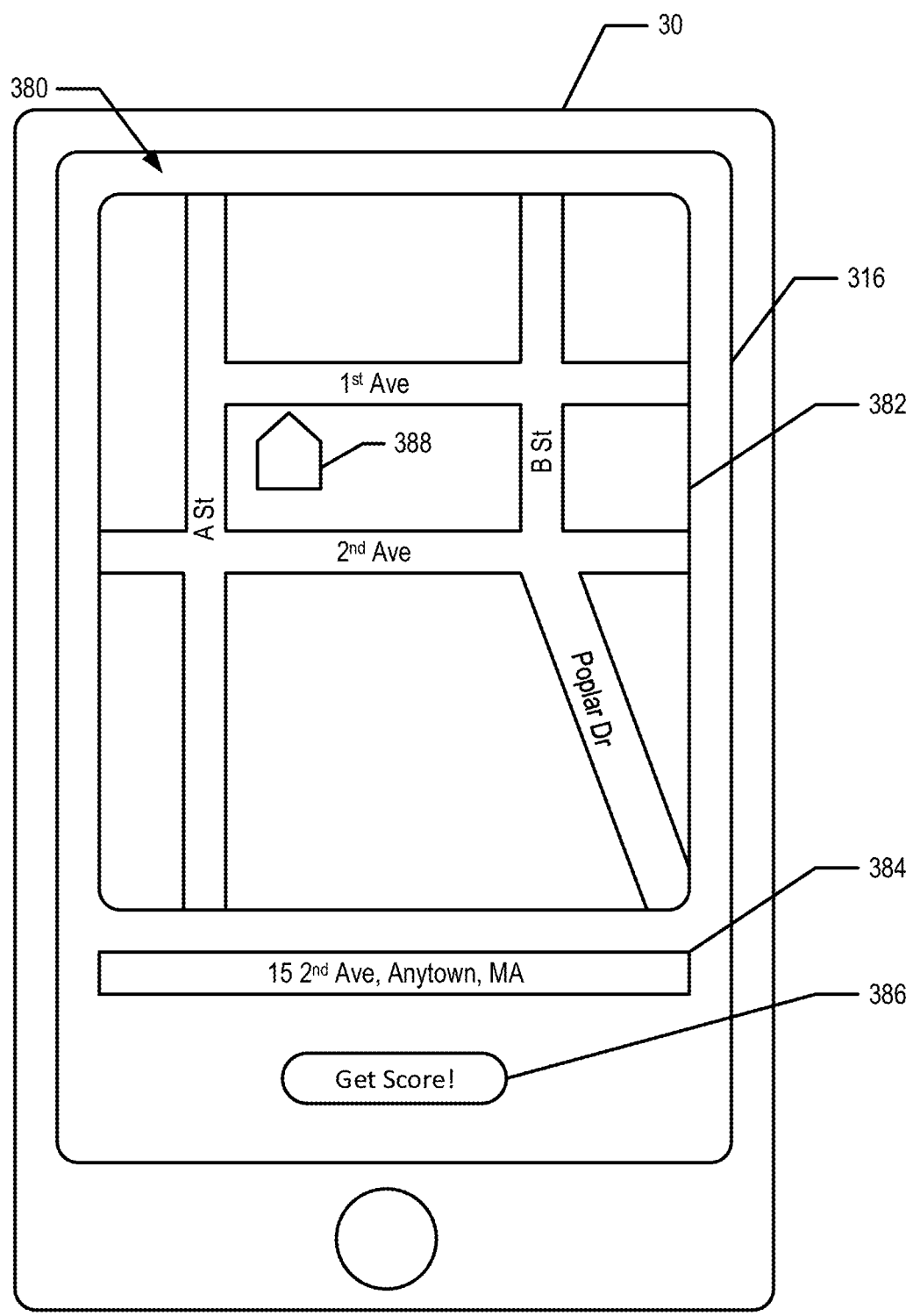
FIG. 5 is an example screen view of an interactive user interface of a user computing entity used to submit a score request, according to an example embodiment of the present invention.

FIG. 5 provides an example view of a request submission interface 380 provided by a display 316 of a user computing entity 30. In an example embodiment, an application stored in memory 322, 324 is executed by the processing device 308 to cause the display 316 to display the request submission interface 380. For example, operation of the application by the user computing entity may cause the request submission interface 380 to be provided by the display 316 of the user computing entity 30. In an example embodiment, the request submission interface 380 may include a map portion 382 that displays one or more layers of map information/data representing a geographical area. For example, the location determining aspect of the user computing entity 30 may determine the current location of the user computing entity 30 and the map portion 382 may then display one or more layers of map information/data representing a geographical area comprising the current location of the user computing entity 30. In an example embodiment, the map portion 382 may comprise means such that a user may, by interacting with the map portion 382 using one or more user input/interaction interfaces of the user computing entity 30, zoom, scroll, and/or the like through the map to cause the map portion 382 to display a geographic area comprising the observation point O. The user may then select, using the one or more user input/interaction interfaces of the user computing entity 30, the approximate location of the observation point O. The user selection of the approximate location of the observation point O may cause an observation point indicator 388 to be displayed by the map portion 382 at the user selected approximate location. In an example embodiment, the approximate address of the approximate location of the observation point O may be displayed and/or provided in address field 384. The user may then select the selectable submission element 386 to submit the score request. For example, responsive to receiving input indicating user selection of the selectable submission element 386, the user computing entity 30 may generate and provide (e.g., via transmitter 304 and/or network interface 320) a score request comprising the approximate address of the approximate location of the observation point O.

In another example embodiment, a user may enter (e.g., via keyboard 318) an address of and/or corresponding to the observation point O in the address field 384 of the request submission interface 380. Responsive to receiving input indicating an address, the application may cause a one or more map information/data layers representing geographic area comprising the user provided address to be displayed via the map portion 382 and an observation point indicator 388 to be displayed at a position in the map portion 382 corresponding to the user provided address. The user may then select the selectable submission element 386 (e.g., via a user input interface) to submit the score request. For example, responsive to receiving input indicating user selection of the selectable submission element 386, the user computing entity 30 may generate and provide (e.g., via transmitter 304 and/or network interface 320) a score request comprising the user provided address corresponding to the location of the observation point O.

As described above, in another example embodiment, the user may operate the user computing entity 30 to capture an image (e.g., digital image data) of the observation point O and the location determining aspect of the user computing entity 30 may determine the location of the user computing entity 30 at the time the image was captured. The location of the user computing entity 30 at the time the image was captured may then be used as and/or to approximate the location of the observation point O. For example, the approximate location of the observation point O may be determined based on the location of the user computing entity 30 at the time the image was captured and an assumed scale of one or more items in the image (e.g., a mailbox, door, window, and/or the like) to approximate the distance between the user computing entity 30 at the time the image was captured and the location of the observation point O. The direction that the user computing entity 30 was facing when the image was captured, as determined by the location determining aspect of the user computing entity 30, and approximate the distance between the user computing entity 30 at the time the image was captured and the location of the observation point O may then be used to approximate the location of the observation point O based on the location of the user computing entity 30 at the time the image was captured. In such an embodiment, the request submission interface 380 may display the image in addition to and/or in place of the map portion 382. The user may then select the selectable submission element 386 (e.g., via a user input interface) to submit the score request. For example, responsive to receiving input indicating user selection of the selectable submission element 386, the user computing entity 30 may generate and provide (e.g., via transmitter 304 and/or network interface 320) a score request comprising the user provided address corresponding to the location of the observation point O.

Continuing with FIG. 4, at block 404, map information/data corresponding to geometry elements within a predetermined maximum distance of the observation point O are accessed. For example, the score computing entity 10 may access map information/data corresponding to one or more geometry elements and/or each geometry element within a predetermined maximum distance of the observation point O. In an example embodiment, the map information/data is accessed from a geographic database stored by the score computing entity 10 (e.g., in memory 14, 18). In an example embodiment, the map information/data is accessed by requesting the map information/data from the map computing entity 20 (e.g., via one or more networks 50) and receiving the map information/data provided by the map computing entity 20 (e.g., via the one or more networks 50). For example, the map information/data and/or the geographic database may comprise a tree index (e.g., an R-tree index) and/or comprise the map information/data required for efficient determination, computation, calculation, and/or the like of a tree index. For example, the tree index may utilize the bounding box of each geometry element. The tree index may then be used to efficiently query for only geometry elements that are within the predetermined maximum distance of the observation point O. Thus, the tree index may be used to reduce the number of geometry elements for which an intersection is determined by pre-selecting only the geometry elements for which a non-zero intersection with at least one of annulus in the set of annuli is expected.

At block 406, a plurality of sections are defined for each geometry element. For example, score computing entity 10 may define N sections $\{l_0, l_1, \ldots, l_{N-1}\}$ along a portion of a geometry element that is within the predetermined maximum distance from the observation point O. In an example embodiment, the number N is predefined. In an example embodiment, the length of the sections $|l_i|$ is predefined and the number of sections N defined along a geometry element is dependent on the predefined length of the sections and the length of the geometry element within the predetermined maximum distance from the observation point. In an example embodiment, the sections are defined by dividing a linear geometry element into a plurality of line segments. In various embodiments, the score computing entity 10 may adaptively modify the accuracy of the determined distance-based score (e.g., by adjusting the number N of sections that a geometry element is divided into and/or the length $|l_t|$ of the sections) such that the distance-based score may be determined within a configurable or predetermined time period. In various embodiments, each section is associated with a group. The group that a section is associated with is determined based on map information/data associated with the section and/or corresponding geometry element. In an example embodiment, the group a section is associated with corresponds to the geometry element of which the section is a part. In an example embodiment, a first group consists of all of the sections of a first geometry element. For example, each geometry element may define a group. In an example embodiment, the groups correspond to types and/or classifications of geometry elements. For example, types of geometry elements in an example noise score embodiment comprise bike paths, pedestrian paths, roadways, flight paths, and/or the like. In an example embodiment, classifications may be a subtype of the type of a section. For example, classifications corresponding to roadways may be the classification of the roadway (e.g., residential road, local road, collector/distributor road, arterial road, county highway, state highway, interstate, freeway, and/or the like). In an example embodiment, each section of a group is assigned the same measure M, which is described in more detail elsewhere herein.

Figure 7:
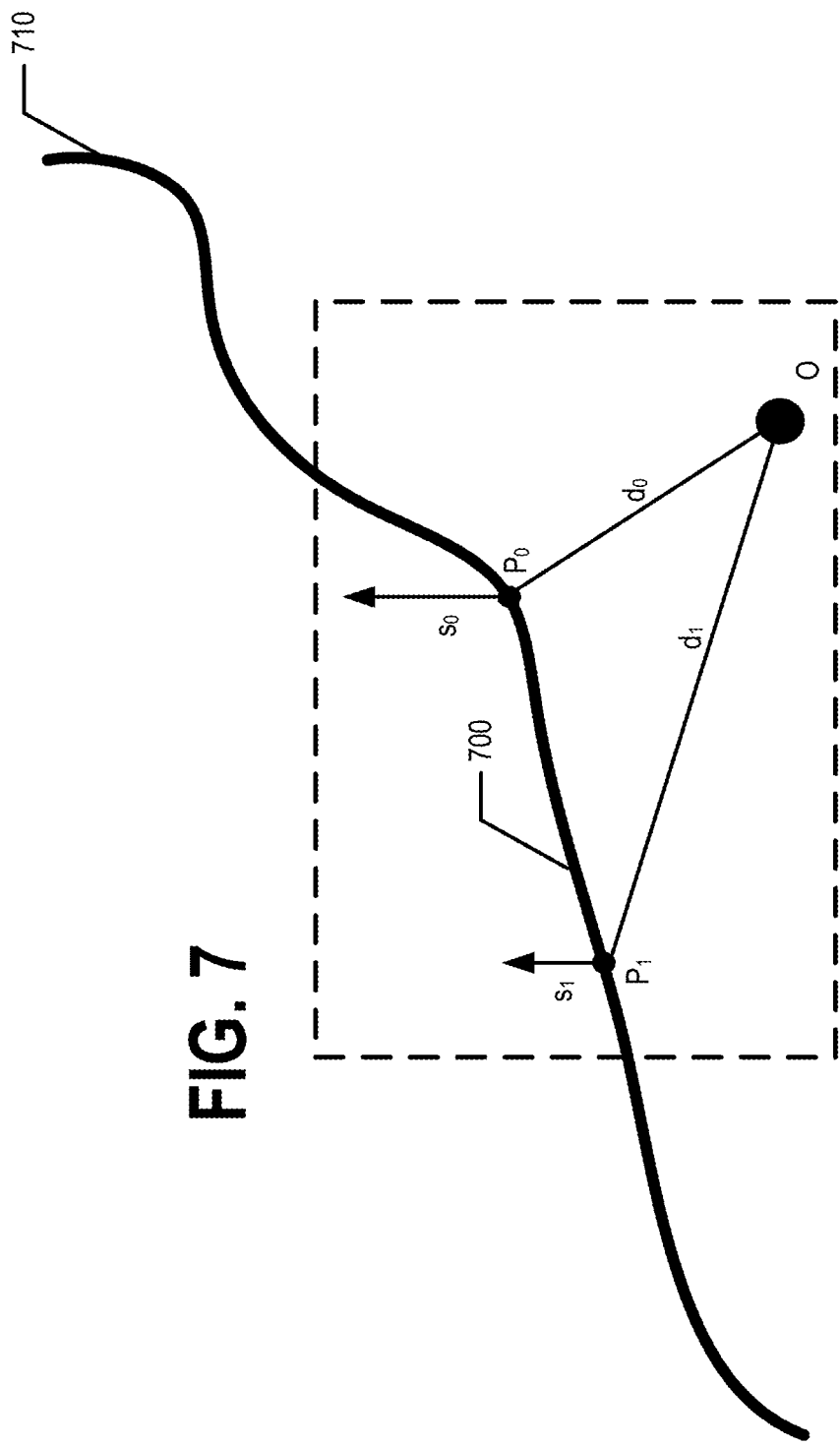
FIG. 7 is a schematic diagram illustrating a portion of a road network and the value of the impact surface at points along a geometry element of the road network, according to an example embodiment of the present invention.

FIG. 7 illustrates an example portion of a road network comprising geometry element 710 with section 700 defined between first point $P_0$ and second point $P_1$ along the geometry element. First point $P_0$ is located a first distance do from the observation point O and second point $P_1$ is located a second distance $d_1$ from the observation point O. A plurality of sections (e.g., N sections) may be defined along the portion of the geometry element 710 that is within the predetermined maximum distance of the observation point O. In the illustrated example embodiment, the geometry element 700 is a roadway, road segment, and/or the like. In another embodiment, the geometry elements may be flight paths, bike or walking paths, landscape elements, and/or the like. In an example embodiment, the map information/data corresponding to the geometry elements may comprise topology information/data.

Figure 6:
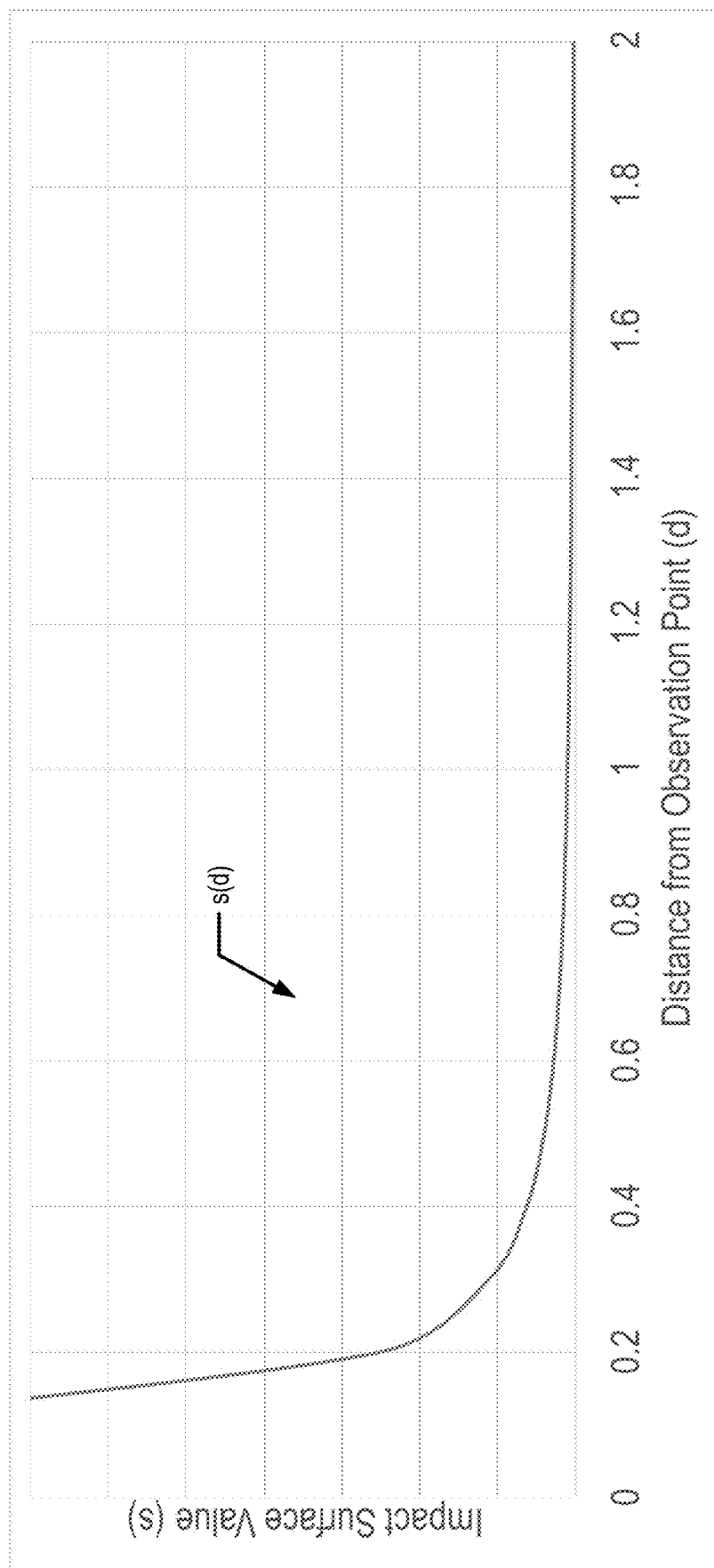
FIG. 6 is a plot showing a profile of an impact surface along the radial coordinate of a polar coordinate system centered at the observation point, according to an example embodiment of the present invention.

Continuing with FIG. 4, at block 408, an impact curtain area is determined for each section. For example, the score computing entity 10 may determine an impact curtain area for each of the plurality of sections defined along the geometry elements. In an example embodiment, an impact curtain area is the area underneath a curve defined along an impact surface by the section. For example, an impact surface may be defined. In an example embodiment, the impact surface is defined by an impact function. In an example embodiment, the impact function depends on the distance from the observation point O. For example, the isolines of the impact surface define concentric circles in an example embodiment. In an example embodiment, damping and/or occlusion elements may be taken into consideration when defining the impact surface such that the isolines of the impact surface are not concentric circles. For example, if the distance-based score is a noise score, it may be known that a noise dampening wall is located between the observation point and one or more roads. The impact surface may take the presence of the noise dampening wall. For example, the impact surface may be discontinuous across the noise dampening wall. In an example embodiment, the value of the impact surface decreases as the distance d from the observation point O decreases. For example, FIG. 6 illustrates an example profile s(d) of an impact surface along the radial coordinate d of a polar coordinate system centered at the observation point. For example, the radial coordinate d of a point is distance from the point to the observation point. The example profile shown in FIG. 6 decreases as square of the inverse of the distance d from the observation point (e.g., d').

Figure 8A:
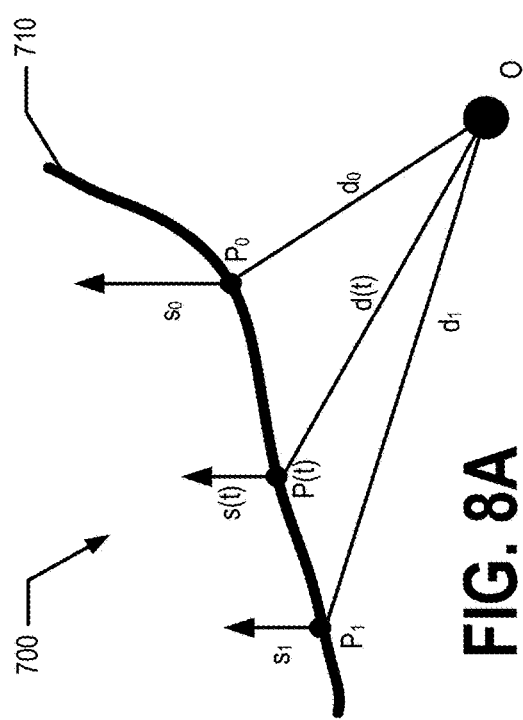
FIG. 8A is a schematic diagram illustrating a section of the geometry element shown in FIG. 7 and determining the corresponding values of the impact surface, according to an example embodiment of the present invention.
Figure 8B:
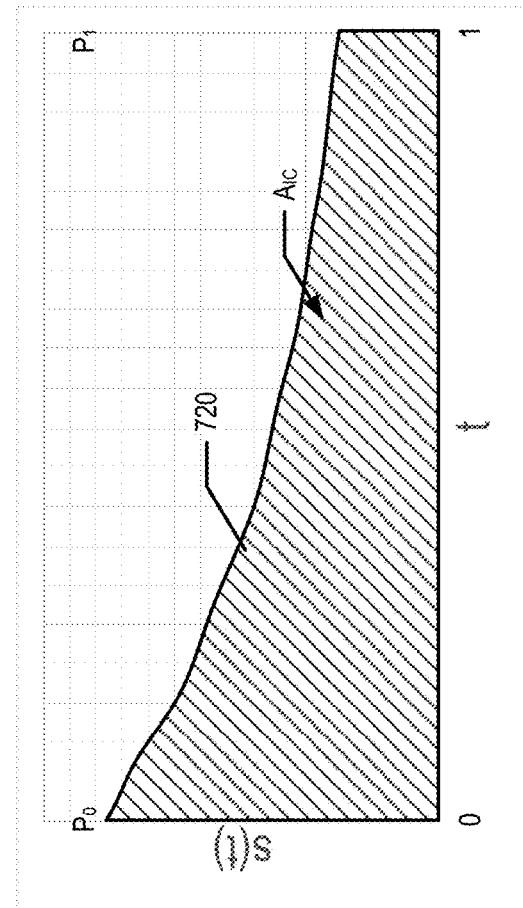
FIG. 8B is a plot showing the impact curtain corresponding to the section of the geometry element shown in FIG. 8A, according to an example embodiment of the present invention.

FIGS. 8A and 8B illustrate an example of determining an impact curtain area $A_{IC}$ corresponding to section 700. In an example embodiment, the impact curtain area $A_{IC}$ is the area of the impact curtain 720 defined between the section 700 of the geometry element 710 and the impact surface. The section 700 extends along the geometry element 710 from a first point $P_0$ to a second point $P_1$. At each point P(t) along the section 700, the impact surface defines a value s(t). For example, at the first point $P_0$, the value of the impact surface is so and at the second point $P_1$, the value of the impact surface is $s_1$. Integrating the value of the impact surface along the section 700 determines the impact curtain area $A_{IC}$. For example, the position of each point P(t) along the section 700 may be parameterized as a function of a dummy variable t. For example, at the first point $P_0$, the dummy variable t may be set to zero and at the second point $P_1$, the dummy variable t may be set to 1, in an example embodiment. The first and second points $P_0$, $P_1$ may then be described as $(x_0, y_0)$ and $(x_1, y_1)$, respectively. For example, any point P(t) along the section 700 may be described as $(x_t, y_t)$, wherein $x_t = x_o + (x_1 - x_o)t$ and $y_t = y_o + y_o)t$. In an example embodiment, x is the latitude of a point along the section 700 and y is the longitude of a point along the section 700, or vice versa. In various embodiments, various other coordinate systems (e.g., other than latitude and longitude) may be used. In various embodiments, the impact curtain area $$A_{IC} = M \frac{\sqrt{\Delta x^2 + \Delta y^2}}{|d(x)\Delta y - d(y)\Delta x|} \arctan\left(\frac{(\Delta x^2 + \Delta y^2)t - d(y)\Delta y - d(x)\Delta x}{|d(x)\Delta y - d(y)\Delta x|}\right)\Bigg|_{t=0}^{t=1},$$

wherein M is a contribution measure corresponding to a quality, parameter, and/or the like of the section 700 and/or geometry element 710, $\Delta x = x_1 - x_0$, $\Delta y = y_n - y_0$, $d(x) = x_h - x_0$, $x_h$ is the x-coordinate of the observation point O, $d(y) = y_h - y_o$, and $y_h$ is the y-coordinate of the observation point O. For example, in the same coordinate system that defines the first point $P_0$ as being at $(x_0, y_0)$ and the second point $P_1$ as being at $(x_1, y_1)$, the observation point O is located at $(x_h, y_h)$.

In various embodiments, the measure M defines the amplitude of the impact surface. In an example embodiment, the measure M is constant across the section 700 and/or the geometry element 710. In various embodiments, the measure M is determined based on a quality, parameter, type, classification, and/or the like associated with the section 700 and/or the geometry element 710. For example, each geometry element 710 may be assigned a measure M. For example, if the assigned measure M is a noise measure and the geometry elements are roadways, the noise measure may indicate a time average noise level per unit length generated by vehicles traveling along the roadway. In an example embodiment, the measure M may be assigned to each geometry element based on a classification or other information/data of the map information/data corresponding to the geometry element. For example, if the geometry element is a road, the measure may be assigned based on road classification (e.g., residential road, local road, collector/distributor road, arterial road, county highway, state highway, interstate, freeway, and/or the like). In an example embodiment, each geometry element 710 may be associated with a type. In an example embodiment, wherein the distance-based score is a noise measure, the types of geometry elements 710 may include roadways, pedestrian paths, bike paths, airplane flight paths, and/or the like. In an example embodiment, one or more types of geometry elements 710 may be divided into a plurality of classifications (e.g., roadways may each be associated with a classification). In an example embodiment, the measure M may be assigned to a geometry element 710 and/or portions thereof based on a priori information/data.

Continuing to block 410 of FIG. 4, the contribution for each geometry element and/or each type or classification of geometry elements is determined. For example, the score computing entity 10 may aggregate the impact curtain areas $A_{IC}$ for each section 700 of a geometry element 710 and/or a type and/or classification of geometry elements. For example, geometry elements 710 may aggregate the impact curtain areas $A_{IC}$ for sections 700 having the same value for the measure M. In various embodiment, the impact curtain areas $A_{IC}$ for sections 700 may be summed, combined, aggregated and/or the like to determine a contribution for each geometry element 710, type and/or classification of geometry elements 710, and/or the like.

In an example embodiment wherein sections 700 are aggregated based on the value of the measure M assigned to the corresponding section, the determination of the impact curtain area $A_{IC}$ of individual sections 700 may not include the measure M. For example, the impact curtain area $A_{IC'}$ for a section 700 may be determined as $$A'_{IC} = \frac{\sqrt{\Delta x^2 + \Delta y^2}}{|d(x)\Delta y - d(y)\Delta x|} \arctan\left(\frac{(\Delta x^2 + \Delta y^2)t - d(y)\Delta y - d(x)\Delta x}{|d(x)\Delta y - d(y)\Delta x|}\right)\Bigg|_{t=0}^{t=1}.$$

Once the impact curtain areas $A_{IC'}$ are combined, summed, aggregated and/or the like for each geometry element 710, type and/or classification of geometry elements, and/or the like (e.g., based on groupings of sections 700 that are assigned the same value of measure M), the combined, summed, aggregated, and/or the like impact curtain area $\Sigma A_{IC'}$ may be multiplied by the corresponding value of the measure M to determine the contribution for each group of sections (e.g., geometry element 710, type and/or classification of geometry elements 710, and/or the like). This technique reduces the number of operations required to determine the contribution for each geometry element 710, type and/or classification of geometry elements 710, and/or the like and therefore reduces the processing and/or time expenses of determining the distance-based score.

At block 412, the score may be determined. For example, the score computing entity 10 may determine the score. For example, the contribution from each geometry element 710, type and/or classification of geometry elements 710, and/or the like may be combined, summed, aggregated and/or the like to determine the score. For example, the contribution from each geometry element 710 may be summed to determine the score. In an example embodiment, the contribution from each type and/or classification of geometry elements 710 may be summed to determine the score. For example, a highway contribution may be determined by summing the contributions from sections 700 and/or each geometry elements 710 associated with the classification of highway (e.g., according to the map information/data corresponding to the geometry element) and a surface street contribution may be determined by summing the contributions from sections 700 and/or geometry elements 710 associated with classifications other than highway (e.g., according to the map information/data corresponding to the geometry element). The score may then be determined by combining, summing, and/or aggregating the highway contribution and the surface street contribution (and contributions from any other separately determined classifications).

Once the score is determined, the score computing entity 10 may provide (e.g., transmit) a score notification comprising the score to the user computing entity 30 (e.g., via the communication interface 16). For example, the user computing entity 30 may receive the score notification provided by the score computing entity 10 (e.g., via the receiver 306 and/or the network interface 320). The user computing entity 30 may then process the score notification (e.g., via processing device 308 and/or the application operating on the user computing entity 30). The processing of the score notification may cause the user computing entity 30 to provide (e.g., visually and/or audibly) the score via the interactive user interface thereof (e.g., display 316 or speakers).

In an example embodiment, the score approximation may be determined prior to receiving the score request. For example, in an example embodiment, a plurality of score approximations for a plurality of observation points O may be determined via batch processing, and/or the like. The plurality of score approximations may then be stored in a database or other data store. In such an embodiment, upon receiving the score request (e.g., from the user computing entity 30), the score approximation may be accessed from the database or other data store based on the observation point O and provided (e.g., transmitted) to the user computing entity 30.

As should be understood, the impact surface may be defined based on a three-dimensional distance from the observation point O. Such a three-dimensional extension of the above described distance-based score may be especially useful in, for example, an embodiment wherein a noise score is being determined that takes into account airplane and/or helicopter flight paths, large changes in elevation across an area, and/or the like. In another example embodiment, the size of each face of a building located at the observation point O may be used to determine the score approximation. For example, if the busiest road in the vicinity of the observation point O is facing the narrowest and/or smallest side of a building (the face of the building having the least surface area) at the observation point O, the noise score at the building may be lower than if the building were rotated such that broadest and/or largest side of the building (the face of the building having the greatest surface area) is facing the busy road.

Although above the determination of the distance-based score is described as being performed by the score computing entity 10, in an example embodiment, the user computing entity 30 may determine the score. For example, the user computing entity 30 may store a geographic database in memory 322, 324 and an application operating on the user computing entity 30 may use at least a portion of the map information/data stored in the geographic database to determine a distance-based score locally.

Various embodiments provide an improvement to computer-related technology. In particular, various embodiments provide a technical solution to the technical problem of calculating a distance-based score in a computationally efficient manner such that moderate computational resources may be used to perform such a calculation for a plurality of users while providing the result in a timely fashion such that the user experiences the distance-based score being returned in real time or near real time with respect to the user requesting the score. Moreover, in various embodiments, the number of sections N and/or the length of each section may be adjusted and/or adapted based on current processing constraints such that a distance-based score may be determined in milliseconds, for example, and/or within a desired time. Thus, various embodiments of the present invention provide a technical solution that improves the functioning of the computer as relates to determination of distance-based scores.

V. Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for improving the computational efficiency of distance-based score approximation, the method comprising:
responsive to receiving a score request, identifying, by a computing entity, an observation point based on a location indicated in the score request;
retrieving, by the computing entity from a geographic database, map information corresponding to one or more geometry elements located within a predetermined maximum distance of the observation point;
defining, by the computing entity, a plurality of sections of each of the one or more geometry elements;
associating each section of the plurality of sections with one of a plurality of groups of sections based on map information corresponding to the geometry element of the one or more geometry elements that corresponds to the section;
for each of the plurality of sections, determining, by the computing entity, an impact curtain area, wherein the impact curtain area for a section is an area under an impact surface defined by values of an impact function at points along the section;
for each group of the plurality of groups of sections, aggregating, by the computing entity, the impact curtain area for each section associated with the group to define a contribution for the group;
aggregating, by the computing entity, the contribution for each group of the plurality of groups of sections to determine the distance-based score; and
providing, by the computing entity, the distance-based score for display via a display of a user computing entity.

2. The method of claim 1, wherein each section of a geometry element is associated with a same group.

3. The method of claim 1, wherein the plurality of groups correspond to at least one of (a) types or (b) classifications of geometry elements.

4. The method of claim 1, wherein the distanced-based score is a noise score approximation.

5. The method of claim 1, wherein a first geometry element of the one or more geometry elements represents a roadway.

6. The method of claim 1, wherein the values of the impact function at points along the section are determined based at least in part on a classification of a geometry element corresponding to the section as indicated by map information corresponding to the geometry element.

7. The method of claim 1, wherein the user computing entity, responsive to user interaction with an interactive user interface, generates and provides the score request and the distance-based score is determined responsive to the computing entity receiving the score request.

8. The method of claim 1, wherein the user computing entity receives a message comprising the distance-based score and, responsive thereto, causes display of the distance-based score approximation via a display of the user computing entity.

9. The method of claim 1, wherein the location indicated in the score request is determined based on at least one of (a) a location determining aspect of the user computing entity, (b) a location entered by the user via the interactive user interface.

10. The method of claim 1, wherein the impact curtain area for a section of a geometry element is determined by integrating the area under an impact surface along a length of the section.

11. The method of claim 10, wherein (a) the impact surface is a surface comprising a first value corresponding to a first point and a second value corresponding to a second point, (b) the first point being closer to the observation point than the second point, and (c) the first value is greater than the second value.

12. The method of claim 10, wherein the impact surface is centered on the observation point.

13. The method of claim 10, wherein isolines of the impact surface are concentric circles.

14. The method of claim 10, wherein defining of the impact surface comprises considering one or more damping elements such that the isolines of the impact surface are not concentric circles.

15. An apparatus comprising at least one processor and at least one memory storing computer program code, the at least one memory and the computer program code configured to, with the processor, cause the apparatus to at least:
responsive to receiving a score request, identify an observation point based on a location indicated in the score request;
retrieve, from a geographic database, map information corresponding to one or more geometry elements located within a predetermined maximum distance of the observation point;
define a plurality of sections of each of the one or more geometry elements;
associate each section of the plurality of sections with one of a plurality of groups of sections based on map information corresponding to the geometry element of the one or more geometry elements that corresponds to the section;
for each of the plurality of sections, determine an impact curtain area, wherein the impact curtain area for a section is an area under an impact surface defined by values of an impact function at points along the section;
for each group of the plurality of groups of sections, aggregate the impact curtain area for each section associated with the group to define a contribution for the group;

aggregate the contribution for each group of the plurality of groups of sections to determine the distance-based score; and provide the distance-based score for display via a display of a user computing entity.

16. The apparatus of claim 15, wherein each section of a geometry element is associated with a same group.

17. The apparatus of claim 15, wherein the plurality of groups correspond to at least one of (a) types or (b) classifications of geometry elements.

18. The apparatus of claim 15, wherein the values of the impact function at points along the section are determined based at least in part on a classification of a geometry element corresponding to the section as indicated by map information corresponding to the geometry element.

19. The apparatus of claim 15, wherein the user computing entity, responsive to user interaction with an interactive user interface, generates and provides the score request and the distance-based score is determined responsive to the computing entity receiving the score request.

20. A computer program product comprising at least one non-transitory computer-readable storage medium having computer-readable program code portions stored therein, the computer-readable program code portions comprising executable portions configured, when executed by a processor of an apparatus, to cause the apparatus to:

responsive to receiving a score request, identify an observation point based on a location indicated in the score request;

retrieve, from a geographic database, map information corresponding to one or more geometry elements located within a predetermined maximum distance of the observation point;

define a plurality of sections of each of the one or more geometry elements;

associate each section of the plurality of sections with one of a plurality of groups of sections based on map information corresponding to the geometry element of the one or more geometry elements that corresponds to the section;

for each of the plurality of sections, define an impact curtain area, wherein the impact curtain area for a section is an area under an impact surface defined by values of an impact function at points along the section;

for each group of the plurality of groups of sections, aggregate the impact curtain area for each section associated with the group to define a contribution for the group;

aggregate the contribution for each group of the plurality of groups of sections to determine the distance-based score; and provide the distance-based score for display via a display of a user computing entity.

* * * * *